United States Patent [19]
Onofrio

[11] Patent Number: 5,865,584
[45] Date of Patent: Feb. 2, 1999

[54] PLYWOOD FASTENER FOR AFFIXING PLYWOOD TO LIGHT GAUGE SHEET METAL

[76] Inventor: Daniel Onofrio, 109 Scantic Rd., East Windsor, Conn. 06088

[21] Appl. No.: 848,447

[22] Filed: May 8, 1997

Related U.S. Application Data

[63] Continuation-in-part of Ser. No. 669,714, Jun. 26, 1996, abandoned.

[51] Int. Cl.[6] .................................................... F16B 35/04
[52] U.S. Cl. .......................................... 411/411; 411/423
[58] Field of Search ................................... 411/386, 387, 411/411–413, 423, DIG. 1

[56] References Cited

U.S. PATENT DOCUMENTS

| | | |
|---|---|---|
| 470,804 | 5/1892 | Jones . |
| 471,179 | 5/1892 | Jones . |
| 684,774 | 10/1901 | Baggs . |
| 3,478,639 | 11/1969 | Gruca . |
| 3,524,378 | 8/1970 | Wieber . |
| 3,682,507 | 8/1972 | Waud . |
| 4,179,976 | 12/1979 | Sygnator . |
| 4,275,541 | 6/1981 | Orals et al. . |
| 4,329,099 | 5/1982 | Shimizu et al. . |
| 4,621,963 | 11/1986 | Reinwall . |
| 4,653,244 | 3/1987 | Farrell . |
| 4,878,793 | 11/1989 | Hewison . |
| 4,900,208 | 2/1990 | Kaiser et al. . |
| 4,959,938 | 10/1990 | De Caro . |
| 5,489,179 | 2/1996 | Gabriel et al. . |

*Primary Examiner*—Flemming Saether
*Assistant Examiner*—Gary Estremsky
*Attorney, Agent, or Firm*—St. Onge Steward Johnston & Reens LLC

[57] ABSTRACT

A fastener and method for securing plywood to sheet metal comprises a head, and a shank with three distinct segments. The first segment is a threaded tip segment with a pierce point tip; the second segment is unthreaded; the third segment is threaded and extends from the unthreaded second segment to the fastener head. The method provides for use of a power tool to secure together a plywood sheet with a sheet metal stud using the fastener.

6 Claims, 1 Drawing Sheet

PLYWOOD FASTENER FOR AFFIXING PLYWOOD TO LIGHT GAUGE SHEET METAL

The present application is a continuation in part of U.S. application Ser. No. 08/669,714, filed Jun. 26, 1996, now abandoned, by inventor herein, Daniel Onofrio, for a "Plywood Fastener."

FIELD OF THE INVENTION

The present invention relates to the field of screw fasteners, and in particular, to fasteners for connecting plywood to a relatively thin sheet metal material.

BACKGROUND OF THE INVENTION

The use of sheet metal studs is a growing trend in new housing and office construction, because sheet metal studs are generally less expensive than wooden studs. Sheet metal studs typically comprise a galvanized steel sheet which is formed to be generally U-shaped in cross-section. In most cases, sheet metal studs are formed from light gauge steel, typically, 25 or 26 gauge galvanized steel.

Traditional nails are not usable to secure plywood sheet or drywall panels to sheet metal studs, as they provide no fastening power. Typically, some type of screw threaded fastener is needed to secure such materials to the sheet metal stud.

Conventional drywall fasteners may be used to mount drywall to sheet metal studs, since the gypsum material which is used in drywall sheets does not bind with the drywall fasteners and the drywall fasteners can pierce and be secured to the sheet metal.

However, conventional plywood sheet materials cannot easily be mounted to sheet metal studs with such drywall fasteners. Typically, when installed with a power tool such as a power screwdriver, the drywall fasteners will cause separation of the plywood sheet from the sheet metal stud and may strip out the hole in the sheet metal so that the plywood sheet is not securely fastened to the sheet metal stud. In addition, the heads of conventional drywall fasteners will not countersink in plywood, such that even if carefully installed so as to avoid jacking of the plywood sheet or stripping of the hole in the sheet metal, the drywall fastener must still be manually screwed in to achieve a countersunk head. If the head is not properly countersunk, it can create problems for subsequent finish carpentry and/or decorative painting, as a flat surface is typically needed to insure a professional finished look to the wall.

Another fastener used for connecting sheet materials to metal members is the screw sold under the registered trademark "TEKS" by Illinois Tool Works, Inc. This screw is illustrated for example in U.S. Pat. Nos. 3,524,378 and 4,275,541 (at FIGS. 6 and 7) and uses a cutting drill end joined with threaded and unthreaded shank sections. The TEKS screw is used for connecting sheet materials to structural steel members but is not usable to attach sheet materials to light gauge sheet metal, as the drill end will cut a hole that is too large to provide any holding power for the fastener.

SUMMARY OF THE INVENTION

It is an object of the invention to provide a plywood fastener and method for securing a workpiece, such as plywood sheet, to a sheet metal member, such as a sheet metal stud, which avoids the aforementioned problems.

It is an object of the invention to provide a plywood fastener and method which can be used with power tools such as a power screwdriver or screw gun, without predrilling of a pilot hole.

It is an object of the invention to provide a plywood fastener and method which will consistently secure the plywood sheet to the sheet metal without problems of stripping out the hole made in the sheet metal by the fastener.

It is an object of the invention to provide a plywood fastener and method which will consistently be self-countersinking when used with power tools, without need for manual screwdriving to achieve countersinking.

A fastener for fastening plywood having a thickness to a sheet metal having a thickness, in accordance with one embodiment of the invention comprises a head, preferably a countersinking flat head adapted to be engaged with a power screwdriving tool; and a cylindrical shank having three segments. The first segment is a threaded tip segment; the first segment has a thread pitch and a pierce point tip whereby the fastener is self-advancing into the plywood. The tip segment has a length that comprises one to four at least partial thread turns, and most preferably about two thread turns. The second segment is an unthreaded shank and is located adjacent the tip segment. The third segment is threaded and extends from the unthreaded second segment to at or near the fastener head. Preferably, the first and third segments are threaded with a screw thread having the same thread pitch. Rotation of the fastener with a power tool engaged with the head portion will cause the fastener to penetrate and advance through the plywood sheet until the pierce point tip is located adjacent the sheet metal and begins to deform the sheet metal, whereupon the third threaded segment engages the plywood sheet and advances the fastener to drive the pierce point tip through the sheet metal, and to secure together the plywood sheet and sheet metal with the third threaded segment of the fastener.

A method of securing together a plywood sheet to a sheet metal stud comprises locating the pierce point of the fastener adjacent the plywood sheet, rotating the fastener with a power tool engaged with the head portion to cause the fastener to penetrate and advance through the plywood sheet until the pierce point tip is located adjacent the sheet metal and begins to push against the sheet metal to cause the sheet metal to deflect from an initial position and to begin to deform the sheet metal; then further advancing the fastener through the plywood sheet by engagement of the third threaded segment of the fastener with the plywood sheet causing the pierce point tip to penetrate the sheet metal and to advance the first threaded segment through the sheet metal; the sheet metal springs back to its initial position without binding with the fastener as the second unthreaded segment of the fastener advances through the sheet metal; and finally a portion of the third threaded segment of the fastener advances into and engages with the sheet metal to secure the plywood sheet to the sheet metal.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 2:
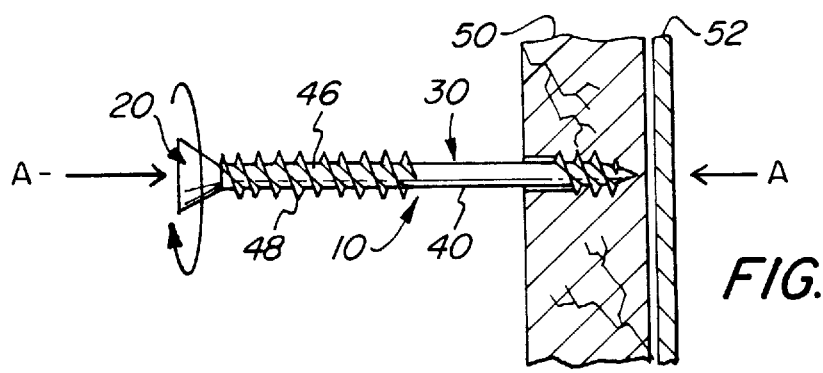
FIG. 2 is a side elevation view showing the use of the plywood fastener of FIG. 1 to secure a plywood sheet to a sheet metal sheet during a first stage in which the tip segment of the plywood fastener penetrates a plywood sheet.

Referring now to FIGS. 1–5, where like numerals indicate like elements in the drawings, a plywood fastener 10 in accordance with one embodiment of the invention is shown. Plywood fastener 10 comprises a fastener head 20 and a cylindrical shank 30.

Fastener head 20 is provided with means for engagement by a fastener driving tool such as a power screwdriver, screw gun, or drill with appropriate bit. Preferably, the engagement means is a Phillips head recess, however, it may comprise any of the known head designs, including straight slot, TORX® recess, square, conventional hex head, etc. Fastener head 20 is preferably a flat head fastener, with a conical shape suitable for countersinking, however, if desired, the head could be any shape, including conventional pan head or hex head. Where a countersinking flat head fastener is used, a plurality of radially extending ribs 22 may be provided along the underside of the head to enhance the countersinking action of the head 20.

Shank 30 comprises three segments: first segment 32, second segment 40, and third segment 46.

The first segment 32 is located at the tip of the shank opposite head 20. First segment 32 is threaded with threading 34; preferably threading 34 of first segment 32 has a thread pitch, and first segment 32 has a sharp pierce point tip 36. A pierce point tip as used herein generally refers to a conical tip section at the end of the fastener, but may include other pointed shapes capable of piercing and extruding (as opposed to drilling into) relatively thing gauge sheet metal. Preferably, the tip 36 is generally provided with a point angle of between about 20–45 degrees, and most preferably 25–35 degrees. The threading 34 preferably comprises a twin thread, i.e., there are two threads symmetrically spaced apart from each other at a relatively high thread pitch. However, a single lead thread, or alternating high and low twin thread, or other type threads, may be used in the invention. The first segment 32 has a length that preferably comprises between one to four at least partial, or whole, thread turns of threading 34, and most preferably about two partial or whole thread turns of threading 34. Where there are twin threads this will mean that there will be one thread turn of one thread and one thread turn of the other thread.

Second segment 40 is unthreaded and preferably has a circular cross-section. Second segment 40 is located between and adjacent to the first segment 32 and the third segment 46. Second segment 40 has a length equal to about 1.0 to about 5.5, and most preferably, about 1.5 times to about 4.5 times the length of the first threaded segment 32.

The unthreaded second segment 40 may have a length which is about equal to the thickness of the plywood to be fastened to a sheet metal stud. Thus for example, if half inch thick plywood is to be mounted to a sheet metal stud, the second segment would have a length of between about 0.40 inches to about 0.625 inches, and preferably about 0.45 inches to about 0.55 inches. If ⅝ inch thick plywood is to be mounted to a sheet metal stud, the second segment would have a length of between about 0.525 inches to about 0.75 inches, and preferably about 0.575 inches to about 0.675 inches. If ¾ inch thick plywood is to be mounted to a sheet metal stud, the second segment would have a length of between about 0.65 inches to about 0.875 inches, and preferably about 0.70 inches to about 0.80 inches. The above examples are intended to be included in the definition of the length of the second segment 40 as about equal to the thickness of the plywood, and similar ranges would be applicable to other nominal plywood thicknesses.

The third segment 46 is threaded with threading 48. Preferably threading 48 is a twin thread as described in reference to thread 34. The third segment 46 extends from the unthreaded second segment 40 to or near to the fastener head 20. Preferably, the first and third segments 32 and 46 are threaded with a screw thread having the same thread pitch. The third segment 46 has a length greater than the total combined thickness of the plywood 50 and the sheet metal 52 that are to be secured together by the plywood fastener 10.

The fastener 10 is preferably formed of steel wire by conventional cold forming processes, and it may be anodized or plated as desired with appropriate protective coatings.

Referring now to FIGS. 2–5, the method of fastening a plywood sheet to a sheet metal stud using the plywood fastener 10 is demonstrated. In FIGS. 2–5, fastener 10 is used to secure together a plywood sheet 50 to a sheet metal sheet (such as a sheet metal stud) 52. As used herein, the term "plywood" and "plywood sheet" generally refers to laminated wood sheets of conventional design, whether entire sheets, or cut or sized portions of sheets, however, the fastener 10 of the present invention may have application in fastening together other types of sheet materials. Thus for example, in the present invention, the term "plywood" may encompass pressed composite sheets formed of wood waste materials and adhesives, and may also include sheets formed of softer woods such as pine boards, and other sheet materials having qualities similar to plywood. The fastener 10 may also be used to secure drywall to a sheet metal stud, though typically the benefits of the invention as described herein are not needed in this application because the gypsum material which forms the drywall typically is not as strong as plywood such that the jacking effect does not arise with drywall. Similarly, the term "sheet metal" encompasses other sheet materials having similar characteristics to sheet metal, and may include metal and plastic sheets. The present invention is suitable in fastening together plywood and sheet metal having a thickness of about 20 to about 30 gauge, and is particularly useful when used with sheet metal studs having a thickness of between about 25 to about 26 gauge.

Figure 3:
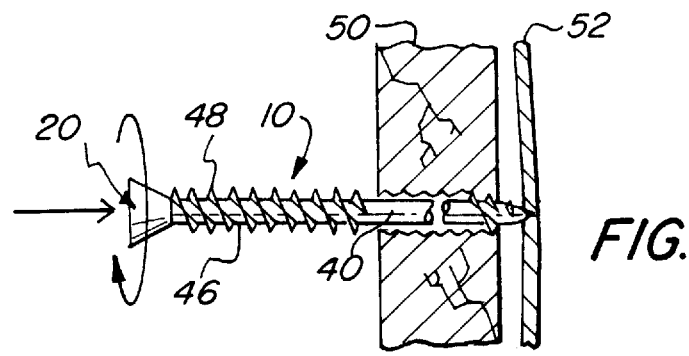
FIG. 3 is a side elevation view showing the use of the plywood fastener of FIG. 1 to secure a plywood sheet to a sheet metal sheet during a second stage in which the tip segment of the plywood fastener begins to penetrate a sheet metal sheet while the second segment rotates freely in the plywood sheet.

Referring to FIGS. 2–5, the method includes rotation of the fastener 10 by a power tool such as an electric screw gun, drill or screwdriver with a bit fitted into the engagement means of the head 20, coupled with force applied along the fastener axis, will cause the fastener 10 to penetrate the plywood 50 until the tip 36 of the first segment 32 is located adjacent the sheet metal 52, as shown in FIG. 2. As shown in FIG. 3, the tip 36 begins to push against the sheet metal 52 to cause sheet metal 52 to deflect from its initial position. The tip 36 also begins to deform the sheet metal 52, forming a small bump in the sheet metal. As also shown in FIG. 3, at this stage the unthreaded second segment 40 rotates freely in the plywood sheet 50.

Figure 4:
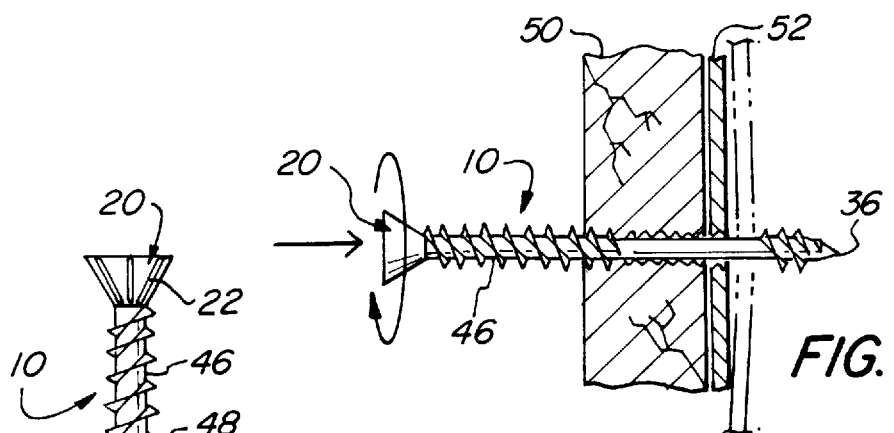
FIG. 4 is a side elevation view showing the use of the plywood fastener of FIG. 1 to secure a plywood sheet to a sheet metal sheet during a third stage in which the third segment of the plywood fastener engages the plywood sheet and drives the tip segment through the sheet metal and advances in the plywood sheet.
Figure 1:
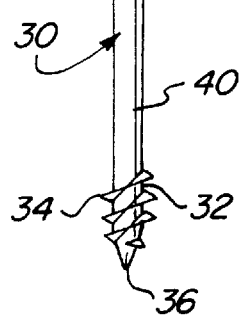
FIG. 1 is a side elevation view of an embodiment of a plywood fastener in accordance with the invention.
Figure 5:
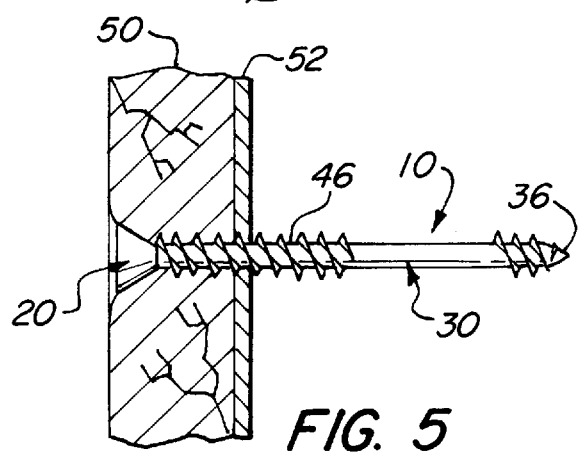
FIG. 5 is a side elevation view showing the use of the plywood fastener of FIG. 1 to secure a plywood sheet to a sheet metal sheet during a final stage in which the third segment of the plywood fastener secures the plywood sheet to the sheet metal.

Additional force applied along the fastener axis causes the third threaded segment 46 to engage the plywood 50 and advance the fastener 10 to drive the first segment 32 of the fastener to pierce the sheet metal 52 and to advance the first threaded segment 32 through the sheet metal 32. As shown in FIG. 4, at this point the sheet metal 52 springs back to its initial position without binding with fastener 10 as the second unthreaded segment 40 of fastener 10 advances through the sheet metal 52. Finally, as shown in FIG. 5, the third threaded segment 46 of fastener 10 advances into and engages with sheet metal 52 to secure plywood sheet 50 to the sheet metal 52. During this final step, the head 20 of fastener 10 is drawn down into the plywood sheet 50 leaving a countersunk head.

The present invention provides significantly greater holding power when attaching plywood to a sheet metal stud than is provided by any prior art device. This is believed to be due to the use of the combination of elements set forth in the following claims, including a pierce point tip that extrudes the sheet metal (in comparison to the drill point of the "TEKS" screw which creates too large a hole) in combination with an unthreaded section allowing the sheet metal to pop back to its initial position after deflection by pressure of the pierce point when driven with a power screwdriving tool. The present invention provides a practical and effective solution to problems of affixing plywood sheets to sheet metal studs.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A fastener for fastening plywood to sheet metal, comprising:
    a head portion having means for engagement with a power screwdriving tool, said head portion being a conical countersinking flat head; and
    means, when said fastener is rotated, for causing said fastener to penetrate and advance through a plywood sheet until a screw tip of said fastener is located adjacent a thin gauge sheet metal, whereupon a third threaded segment engages the plywood sheet and advances the fastener to push said sheet metal away from said plywood sheet and to drive said screw tip through the sheet metal, said sheet metal springing back against said plywood sheet without binding with said fastener as a second, unthreaded, segment of said fastener passes through said sheet metal, said third threaded segment of said fastener then engaging said sheet metal and securing together the plywood sheet and sheet metal; said means including: a cylindrical shank portion, said shank portion including a first threaded segment having said screw tip, said screw tip having threads extending to a pointed end, said first threaded segment having a length that comprises from about one to about four thread revolutions; said second unthreaded segment, having a circular cross-section, extending upwardly from said first threaded segment and having a length equal to about 1.5 times to about 4.5 times said length of said first threaded segment; and a third threaded segment extending upwardly from said second segment to adjacent said head portion, the first and third threaded segments having a same-handed tread direction.

2. A fastener in accordance with claim 1, wherein said screw tip has a point angle of about 20 to about 45 degrees.

3. A fastener in accordance with claim 1, wherein said first and third segments are threaded with a screw thread having the same pitch.

4. A fastener, plywood sheet and thin gauge sheet metal in combination, the fastener comprising:
    a head portion having means for engagement with a power screwdriving tool, said head portion being a countersinking flat head; and
    means, when said fastener is rotated, for causing said fastener to penetrate and advance through the plywood sheet until a screw tip of said fastener is located adjacent the thin gauge sheet metal and begins to deform said sheet metal, whereupon a third threaded segment engages the plywood sheet and advances the fastener to push said sheet metal away from said plywood sheet and to drive said screw tip through the sheet metal, said sheet metal springing back against said plywood sheet without binding with said fastener as a second, unthreaded, segment of said fastener passes through said sheet metal, said third threaded segment of said fastener then engaging said sheet metal and securing together the plywood sheet and sheet metal; said means including: a cylindrical shank portion, said shank portion including a first threaded segment having said screw tip, said screw tip having threads extending to a pointed end, said first threaded segment having a single revolution of twin threads; said second unthreaded segment, having a circular cross-section, extending upwardly from said first threaded segment and having a length about equal to a thickness of said plywood sheet; and a third threaded segment extending upwardly from said second segment to adjacent said head portion, said third threaded segment having a length greater than a thickness of both said plywood sheet and said sheet metal, the first and third threaded segments having a same-handed thread direction.

5. The combination in accordance with claim 4 wherein said sheet metal has a thickness of about 25–26 gauge.

6. A fastener in accordance with claim 4, wherein said head comprises a conical countersinking flat head.

* * * * *